(12) United States Patent
Harper

(10) Patent No.: US 9,657,489 B2
(45) Date of Patent: May 23, 2017

(54) FRACTAL STIFFENING

(71) Applicant: THE BOEING COMPANY, Chicago, IL (US)

(72) Inventor: David William Harper, Madison, AL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/739,539

(22) Filed: Jun. 15, 2015

(65) Prior Publication Data
US 2016/0362905 A1 Dec. 15, 2016

(51) Int. Cl.
| E04H 7/00 | (2006.01) |
| B64C 1/08 | (2006.01) |
| B64C 1/12 | (2006.01) |
| E04C 2/08 | (2006.01) |
| E04C 2/32 | (2006.01) |
| E04C 2/38 | (2006.01) |
| E04C 2/42 | (2006.01) |

(52) U.S. Cl.
CPC ............... *E04H 7/00* (2013.01); *B64C 1/08* (2013.01); *B64C 1/12* (2013.01); *E04C 2/08* (2013.01); *E04C 2/32* (2013.01); *E04C 2/384* (2013.01); *E04C 2/427* (2013.01)

(58) Field of Classification Search
CPC ............... E04H 7/00; Y10T 428/24149; Y10T 428/236; B64C 1/08
USPC ...... 52/630, 81.1, 81.2, 81.3, 81.4; 428/116, 428/117, 119, 167, 178, 179
See application file for complete search history.

(56) References Cited

U.S. PATENT DOCUMENTS

| 2,371,754 A | | 3/1945 | Gillum et al. | |
| 3,857,150 A | * | 12/1974 | Faucheux | E04B 1/19 29/525.08 |
| 4,012,549 A | * | 3/1977 | Slysh | B64C 1/08 244/119 |
| 4,052,523 A | * | 10/1977 | Rhodes | B32B 3/12 428/116 |
| 4,086,378 A | | 4/1978 | Kam et al. | |

(Continued)

FOREIGN PATENT DOCUMENTS

DE 10012906 A1 6/2001

OTHER PUBLICATIONS

Hao, P., et al., "Hybrid optimization of hierarchical stiffened shells based on smeared stiffener method and finite element method," Thin-Walled Structures 82 (2014) 46-54.

(Continued)

*Primary Examiner* — Joshua J Michener
*Assistant Examiner* — Alp Akbasli
(74) *Attorney, Agent, or Firm* — McDonnell Boehnen Hulbert & Berghoff LLP

(57) ABSTRACT

A structural support having fractal-stiffening and method of fabricating the support is presented where an optimized location of at least three nodes is predetermined prior to fabricating the structural support where a first set of webs is formed on one side of the support and joined to the nodes to form a first pocket region. A second set of webs is formed within the first pocket region forming a second pocket region where the height of the first set of webs extending orthogonally from the side of the support is greater than the second set of webs extending orthogonally from the support.

20 Claims, 5 Drawing Sheets

(56) References Cited

U.S. PATENT DOCUMENTS

| | | | | |
|---|---|---|---|---|
| 4,137,354 | A | * | 1/1979 | Mayes, Jr. ............ B29C 53/564 156/175 |
| 4,612,225 | A | * | 9/1986 | Graffam .................... E04C 2/20 264/164 |
| 4,725,334 | A | * | 2/1988 | Brimm ...................... C23F 1/04 216/34 |
| 4,749,155 | A | * | 6/1988 | Hammer ................... B64C 3/26 244/119 |
| 6,502,788 | B2 | * | 1/2003 | Noda ........................ B32B 3/18 244/119 |
| 7,093,470 | B2 | * | 8/2006 | El-Soudani ............ B21D 26/08 29/421.2 |
| 7,192,145 | B2 | * | 3/2007 | Ealey ....................... G02B 5/08 359/846 |
| 9,266,303 | B2 | * | 2/2016 | Fink .......................... B32B 3/12 |
| 2001/0015043 | A1 | * | 8/2001 | Brenneis ................... B64C 1/12 52/630 |
| 2004/0055349 | A1 | | 3/2004 | El-Soudani |
| 2005/0115186 | A1 | * | 6/2005 | Jensen ...................... A45F 3/04 52/633 |
| 2009/0320398 | A1 | | 12/2009 | Gouvea |
| 2011/0247679 | A1 | * | 10/2011 | Shelef ........................ F24J 2/07 136/246 |
| 2012/0186175 | A1 | * | 7/2012 | Gerkes .................... E04B 9/006 52/220.6 |
| 2012/0245862 | A1 | * | 9/2012 | Coudouent ......... G06F 17/5018 702/42 |
| 2013/0030529 | A1 | * | 1/2013 | Hunt ................... A61F 2/30771 623/16.11 |

OTHER PUBLICATIONS

Quinn, D., et al., "Stiffened panel stability behaviour and performance gains with plate prismatic sub-stiffening," Thin-Walled Structures 47 (2009) 1457-1468.

Rayneau-Kirkhope, D., et al., "Ultralight Fractal Structures from Hollow Tubes," Physical Review Letters 109, 204301-1-204301-4 (2012).

Watson, A., et al., "Optimization of Postbuckled Stiffened Panels with Multiple Stiffener Sizes," 48th AIAA/ASME/ASCE/AHS/ASC Structures, Structural Dynamics, and Materials Conference, 15th Apr. 23-26, 2007, Honolulu, Hawaii, pp. 1-8.

Bushnell, D., et al., "Optimum Design of Stiffened Panels With Substiffeners." American Institute of Aeronautics and Astronautics, AIAA-1932, pp. 1-54, 2005.

Quinn, D., et al., "Aerospace Stiffened Panel Initial Sizing With Novel Skin Sub-Stiffening Features," International Journal of Structural Stability and Dynamics, vol. 12, No. 5, 1250060-1-1250060-23, 2012.

Farr, R.S., "Fractal design for efficient brittle plates under gentle pressure loading," Physical Review E 76, 046601 2007.

European Search Report for corresponding EP application No. 16171276.5, dated Nov. 11, 2016.

* cited by examiner

FRACTAL STIFFENING

STATEMENT OF GOVERNMENT SPONSORED SUPPORT

This invention was made with Government support under contract number NNM07AB03C awarded by the NASA. The government has certain rights in this invention.

TECHNICAL FIELD

This disclosure generally relates to fractal-stiffening. More specifically, the disclosure concerns fractal-stiffening of isogrid and orthogrid structural support systems, referred to here as fractalgrids.

BACKGROUND

A number of structures with very high strength-to-weight ratios have been developed for special applications, such as aircraft and aerospace uses. Some of these structures, typically fabricated from metals such aluminum and titanium, rely on very weight efficient configurations to obtain the desired strength, stiffness, etc. One well-known configuration, called isogrid, has upstanding ribs generally integral with the skin (or membrane) material and arranged in a repeating pattern of equilateral triangles that touch the other equilateral triangles along shared sides and at corners of the triangles in an isogrid configuration. The intersections of the stiffeners where the corners of the triangles touch are typically called nodes, and are often used as attachment points for secondary structures. Isogrid and similar stiffener configurations, such as orthogrid, are the most common designs employed for integrally grid-stiffened panels. Such grid-stiffened structural supports can be used to fabricate a variety of vehicle parts, for example, fuel tanks and load-bearing aerospace panels. Standard isogrid, orthogrid, and other grid-stiffened panel applications are typically designed to prevent local buckling and global buckling.

Local buckling can manifest itself as crippling of the stiffeners and pocket buckling of the skin, and global buckling is typically characterized as a general, large scale collapse of the structure. Weight optimization of grid-stiffened structures to prevent local buckling tends to bias panel design towards small pocket sizes (stiffeners spaced close together) and smaller stiffeners, while global buckling biases the panel towards larger pocket sizes and larger, more efficient stiffeners. As such, local and global buckling are at odds with respect to the panel dimensions, and typical grid-stiffened panels are a compromise between preventing local and global failure.

To increase the performance of aerospace structures, there is a need for improved isogrid and orthogrid structures that prevent buckling with strength-to-weight ratios that surpass current designs. In particular, because isogrid structures are ideally suited for spacecraft, launch vehicles, and aircraft, the significant weight savings provided by the present invention allows for more payload to be delivered into orbit or for improved fuel efficiency. These and other advantages are described below with reference to the accompanying figures.

SUMMARY

A fractal-stiffened support structure or fractalgrid can be fabricated by including one or more secondary stiffening structures (fractalgrid) with a primary stiffening structure. A preferred method of designing and fabricating a fractal-stiffened structure involves first determining panel dimensions based on material properties, design requirements, and manufacturing constraints, then forming a first set of webs onto a first side of the structure, wherein the first set of webs comprises first linear ribs that extend orthogonally from the first side to define a first height away from the structure. The first set of webs are integral with each other at positions that coincide with the previously determined or predetermined positions of the nodes such that the first set of webs and nodes define a first pocket region. During the fabrication of the first set of webs, a secondary set (or sets) of webs can be simultaneously constructed within the first pocket region.

Each web of the second set of webs comprises second linear ribs that extend orthogonally from the first side of the structure to define a second height away from the structure, where the second height is less than the first height of the first set of webs. The second set of webs connects with each other and the first set of webs to define a second pocket region. This method of fabrication results in a structural support panel comprising a skin sheet having an inner surface and an outer surface. The stiffening structure is typically on one of the two surfaces, although it is possible to have stiffening structure on both surfaces. The first set of ribs on the inner surface has a uniform repeating first pattern of a first set of webs, wherein the first set of webs comprise first linear ribs that extend orthogonally from the inner surface of the skin to a first height away from the inner surface, wherein the first set of webs connect and are integral with each other at positions that coincide with nodes that are selected to be in predetermined locations, and wherein the first set of webs define a first pocket region on the inner surface.

There is also a uniform repeating second pattern of a second set of webs within the first pocket region, wherein the second set of webs comprise second linear ribs that extend orthogonally from the inner surface to define a second height away from the inner surface, wherein the second height is less than the first height, and wherein the second set of webs connect with each other to define a second pocket region. The second linear ribs of the second set of webs have a longitudinal axis that joins a first linear rib of the first set of webs, such that the longitudinal axis is perpendicular the first linear rib at the point of intersection with the first set of webs. The second linear rib typically bisects the first linear rib, although division of the first linear rib by more than one second linear rib can be implemented.

The features, functions, and advantages that have been discussed can be achieved independently in various embodiments or may be combined in yet other embodiments, further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

Figure 1:
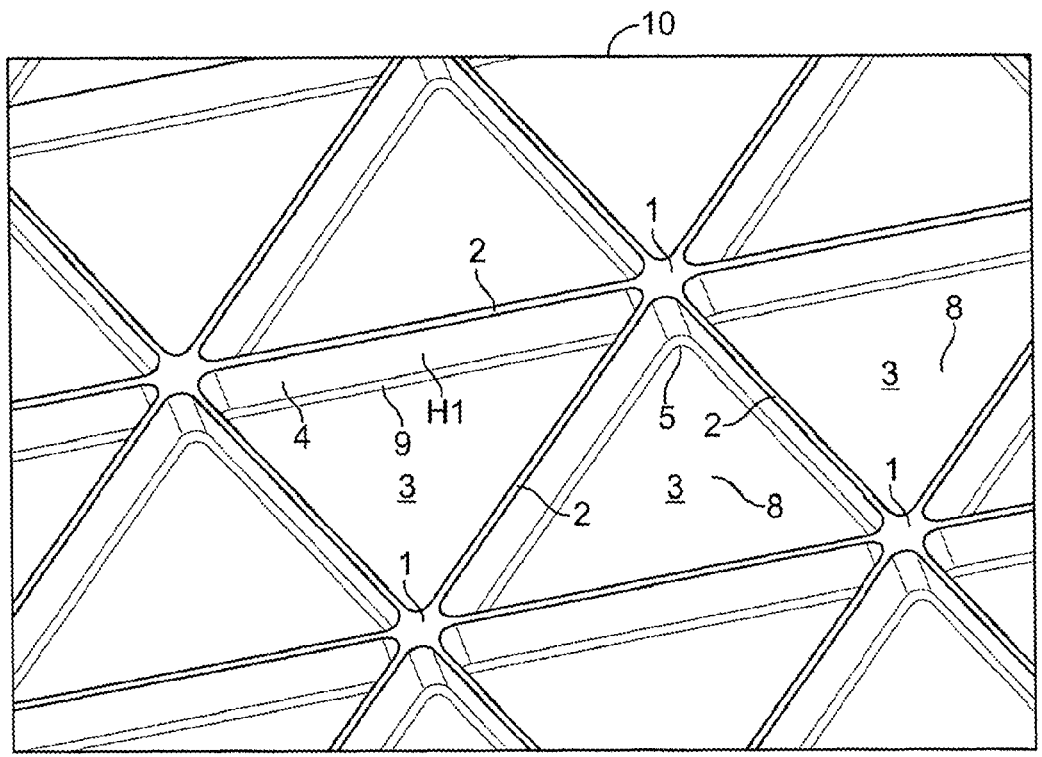
FIG. 1 is a diagrammatic representation of a perspective view of a section of a known isogrid structural support.

Disclosed embodiments will now be described more fully below with reference to the accompanying drawings, in which some, but not all of the disclosed embodiments are shown. Indeed, several different embodiments may be provided and should not be construed as being limited to the embodiments set forth in this disclosure.

In a typical aerospace vehicle or system, a significant portion of the overall mass is load-bearing structure. The isogrid and orthogrid structural supports of the present disclosure provide two advantages, one is lighter weight without compromising capability, and the other is greater adjustability of the larger stiffeners locations without a significant weight penalty. The ability to modify the location of the nodes without a significant weight increase reduces potential weight increases due to load changes, as well as improving the ability to optimize the location of nodes to reduce weight from secondary structure rather than requiring the secondary structure to accommodate attachments dictated by the primary structure. In other words, the use of one, two or more secondary stiffening structures, as described below, allows the nodes for the primary nodes to be located in a predetermined fashion such that these nodes will be best utilized as attachment points to support and/or anchor one or more secondary hardware and structures.

One possible fractalgrid structure design of this disclosure comprises a primary isogrid stiffening structure with one or more additional secondary isogrid stiffener structures. The pocket regions defined by a set of webs (stiffeners) in each subsequent structure decrease in size by half. The primary benefit of fractalgrid design is weight reduction. The additional stiffening structures prevent local buckling of the skin, and therefore allow the skin thickness to decrease (which is the primary source of the weight reduction). The additional stiffeners, fillets and rounds in the secondary structure(s) partially negate some of the weight savings, but overall the fractalgrid design offers more than an 11% weight savings based on initial estimates. The secondary stiffening structures can also provide benefit to preventing global buckling. In theory, the secondary stiffener structures could be repeated an infinite number of times, however the added mass associated with the additional rounds and fillets create a limit to the mass savings, and for a particular application, one too many secondary stiffener structures will begin to reverse the mass savings. A second benefit of the fractalgrid structures of this disclosure is that the design is more customizable and is less sensitive to changes in specific dimensions. Thus, it allows for predetermination of a desirable grid spacing based on secondary hardware attachments or manufacturing constraints without the weight penalty associated with modifying the primary isogrid dimensions. Standard isogrid designs are very weight sensitive to node spacing (i.e. pocket size), and changes in node spacing can result in significant weight increases. Moreover, due to the weight sensitivity to node spacing, performance and mass requirements often dictate the node spacing. Secondary hardware is then forced to adapt to the selected node spacing, rather than selecting a node spacing that may be more beneficial to secondary attachments. For example, if a standard isogrid configuration has an optimized node spacing of 5", but the majority of the attaching hardware will need a node spacing larger than 12", then the attaching hardware will likely be heavier and more complicated (requiring more design time and cost). Alternatively, if the standard isogrid is modified to be more beneficial to attaching hardware, the associated mass increase of the isogrid itself may not be acceptable due to performance and mass requirements.

If the primary node spacing of a fractalgrid configuration of this disclosure is changed, the secondary stiffener structure(s) and skin can be re-optimized to reduce any potential weight increase. This adjustability makes the fractalgrid of this disclosure less weight sensitive to changes in primary node spacing. Fractalgrid node spacing can therefore be selected based on secondary attachment factors, such as the size of secondary hardware, secondary hardware mass, reuse of existing attachment hardware, reduction in secondary loads, lowest combined mass of fractalgrid and secondary structure, or a combination thereof. Although primary node locations provide the most robust attachment points, the secondary node locations of the fractalgrid may be used as well, which can result in a higher density of attachment points over standard isogrid.

Figure 7:
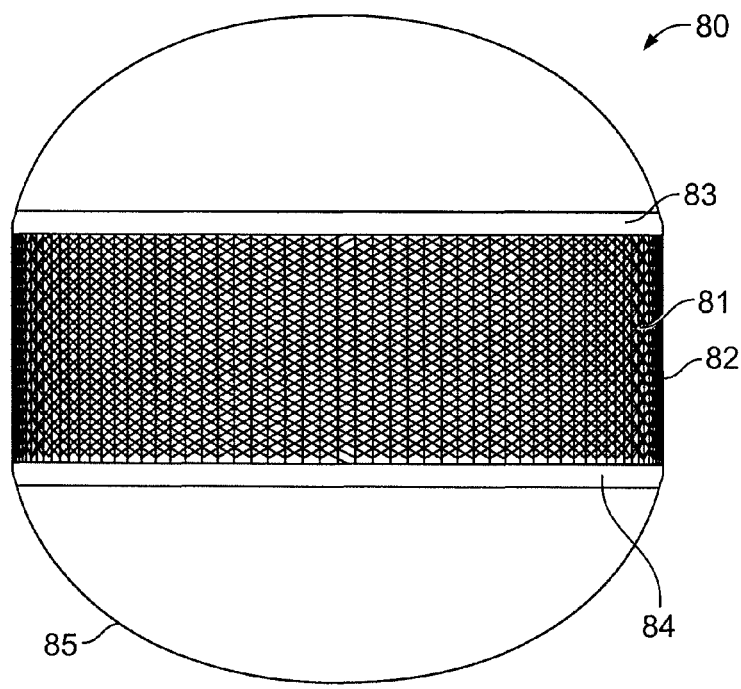
FIG. 7 is a graphical representation of a cross-section of a possible fuel tank design incorporating the fractalgrid structure of the present disclosure.

The fractalgrids of this disclosure provide a unique stiffening concept that provides a lighter-weight structure for compression or buckling critical applications, and can be used in a number of other load conditions as well, for example, grid-stiffened panels are used in numerous aerospace applications, as well as commercial applications that are sensitive to weight or material costs, such as fuel tank construction. FIG. 7 presents one possible configuration of such a fuel tank 80 incorporating fractalgrid panels 81 on inside cylindrical section 82 of tank 80. The fractalgrid panels 81 are supported by interface rings 83 and 84 that interface with tank surface 85.

The present disclosure provides a method of designing and manufacturing a fractalgrid support structure, preferably one that is modeled after a conventional isogrid design, but that differs and improves upon the known structure in that it has one or more secondary stiffening grid structures included within the isogrid primary web structure. In one embodiment, the manufacturing method results in an isotropic structure having equal properties measured in all directions. This may be accomplished by fabricating web sets (stiffeners) that form equilateral triangle webs for both the primary structure and the secondary fractalgrid structures.

The fractalgrid support structures of this disclosure can be machined from single sheet or plate of material, for example a metal such as aluminum, or fabricated using a composite laminate. In some cases, depending on the desired thickness of the panel surface (sometimes referred to as the skin or membrane or wall), chemical milling maybe used for metallic materials. Fractalgrid can be fabricated using the same manufacturing techniques as that used to fabricate a standard isogrid design. For typical Computer Numerical Control (CNC) machining tools, the fractalgrids of this disclosure can be fabricated with no adjustment of to the manufacturing hardware, and only requires reprogramming.

FIG. 1 shows a section of a larger panel of a known isogrid design 10 having sets of webs 2 that join together in generally circular nodes 1. Each web is in the form of a linear rib 4 extending orthogonally (out of the page) a height or distance H1 from one side of panel 3 of the support structure 10. In the isogrid design of FIG. 1, the nodes 1 form the apices of an equilateral triangle and the combination of the nodes and webs define pocket regions 8 (i.e., the interiors of each of the repeating equilateral triangles). The linear ribs 4 are preferably integral with panel 3 where fillets 9 join ribs 4 and panel 3.

Figure 2:
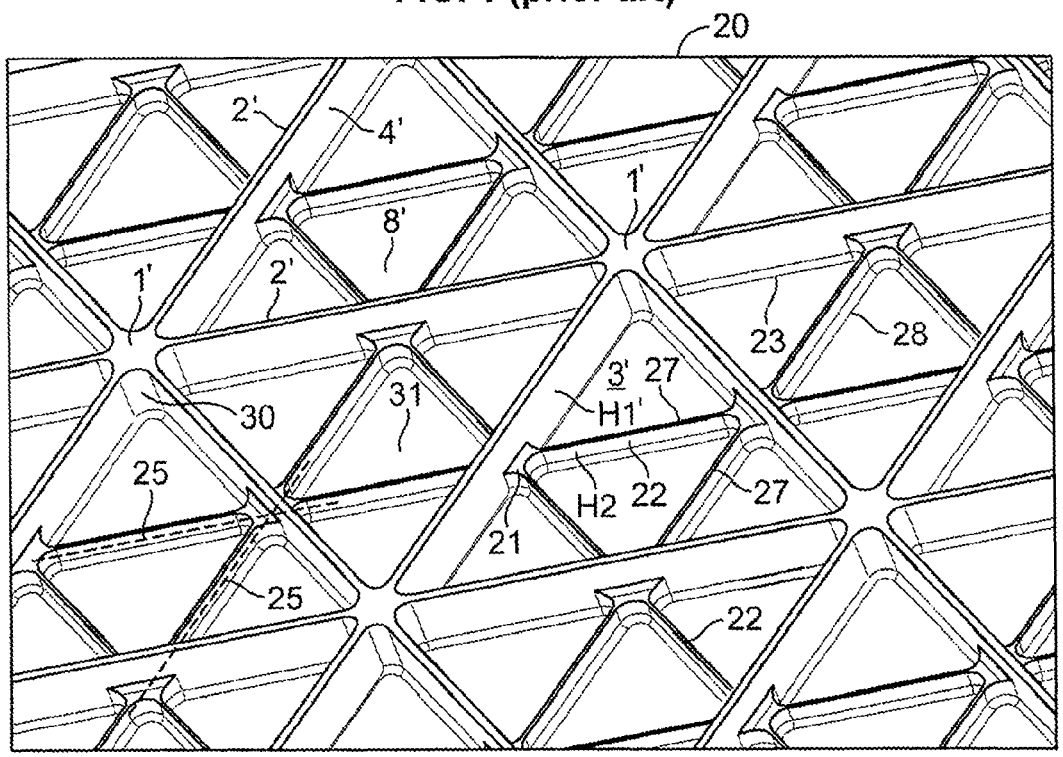
FIG. 2 is a diagrammatic representation of a perspective view of a section of one possible fractalgrid support structure according to this disclosure having a secondary structure of fractal-stiffeners.

FIG. 2 illustrates a section of a larger panel of a first embodiment of one possible fractalgrid structure 20 of this disclosure where secondary fractalgrid structures 21, 22, 27 are located within the pocket region 8' of primary fractalgrid structural support structures 1', 2', 4'. The first web sets 2' in combination with nodes 1' form first pocket regions 8' of the primary fractalgrid structures. Within the first pocket regions 8' are a second set of webs 27, wherein each web in the second set of webs 27 is formed as a linear rib 22 extending orthogonally (out of the page) a height (or distance) H2 from one side of panel 3' of the structure. The distance H2 is less than distance H1' and typically H2 is about 10-50% of H1'. Factors that influence the relationship between H2 and H1' include material properties, manufacturing constraints, skin thickness, and node spacing, whether driven by weight considerations alone, or other factors such as secondary attachments. The linear ribs 22 of the secondary fractalgrid structures joined together to form bisecting rounds 21, which are preferably integral with linear ribs 4' of the primary fractalgrid structures. Linear ribs 22 each have a longitudinal axis 25 that preferably bisects the linear ribs 4' to create an equilateral triangle comprised of the second set of webs 27. The joining of the linear ribs 22 defines second pocket regions 31 within the first pocket regions 8'.

When a solid substrate, metal, composite, or the like material is used as the starting material and is subject to, for example, a mechanical milling process to fabricate the fractalgrids of this disclosure, fillets 23, 28, and rounds 30 can be formed, in addition to the bisecting rounds 21. The fillets provide a smooth transition between the stiffeners and skin, which may be preferred over a sharp corner which can induce high local stresses and encourage crack growth. The fillets between the stiffeners, both primary and secondary, may also reduce stresses and reduce crack growth concerns, but may be increased in some or all nodes to provide adequate material for secondary hardware attachments, such as an insert or bolt hole. Smaller stiffener-to-stiffener fillets can be achieved for additional weight savings, but may require smaller cutters using a CNC machining process, which may require more machining time. One possible design and manufacturing process starts by predetermining the location of the nodes 1' keeping in mind the possibility of adding secondary hardware after the fractalgrid structure of this disclosure is fabricated. One method of predetermining node location is by using a finite element analysis, or a comprehensive set of closed-form solutions and secondary attachment considerations to determine node location and starting material selection. The skin-to-rib fillet sizes will be based primarily on manufacturing and stress considerations, while the rib-to-rib fillets are selected based on attachment locations and manufacturing considerations. Nodes with attachments can be machined with bigger fillets, and nodes without attachments can be machined with smaller fillets based on the cutter size, which is chosen by balancing machining time and additional weight savings. The next step preferably involves using a computer controlled milling machine that is configured to simultaneously form both the first set of webs 2' and the second set of webs 27, and panel or skin 3'.

Figure 6:
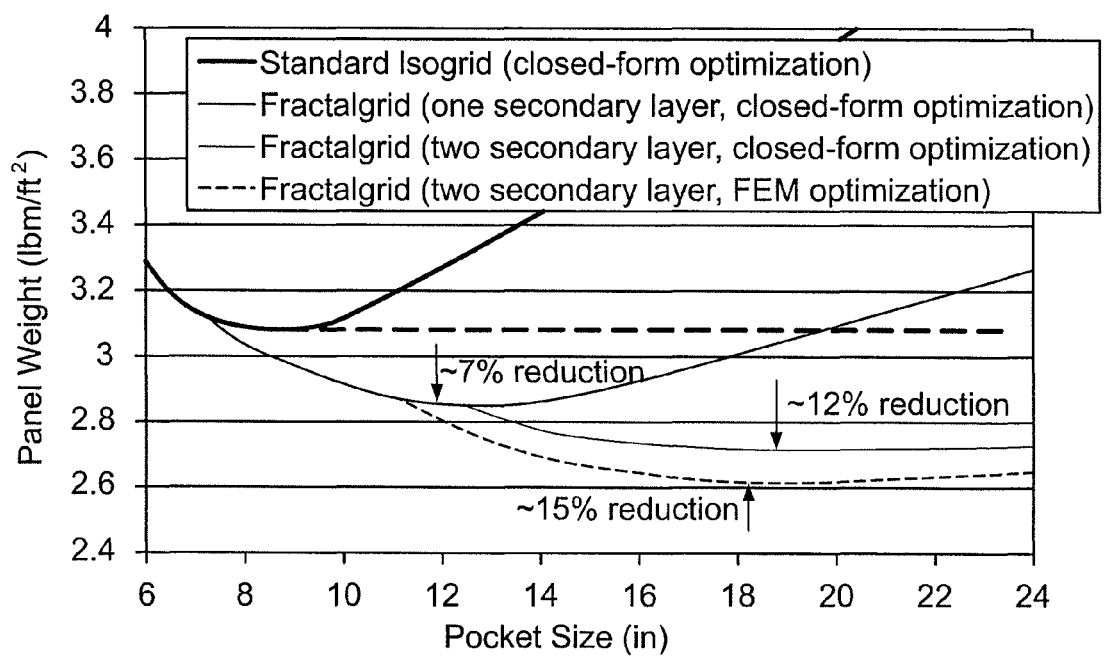
FIG. 6 is a graphical representation of the relationship of structural panel weight to pocket size both for known isogrid structures and for fractal grid structures according to the present disclosure.

Multiple secondary fractalgrid structures (e.g., with heights H2 or lower) can be used to form the complete fractalgrid structures of this disclosure, wherein each secondary fractalgrid structure added further reduces the potential of local bucking of the skin and, therefore, allows the skin thickness to decrease. Each secondary fractalgrid structure typically has a scaling factor of 2 that defines the reduction in pocket size for each subsequent secondary fractalgrid structure. Estimated weight savings of approximately 11% are possible when two secondary fractalgrid structures are used, however, the savings can vary because it is dependent on design loads, predetermined material, and manufacturing constraints. This is illustrated in FIG. 6 where panel weight is correlated against pocket region size of a known isogrid structure compared to the fractalgrids of this disclosure. As can be seen in the graph, standard isogrid is sensitive to weight, and is weight efficient over a smaller range of node spacing. Both fractalgrid configurations of this disclosure with one and two secondary structures are less sensitive to node spacing, as the secondary stiffeners can be adjusted and re-optimized as the primary node spacing changes. A single secondary stiffener structure is more weight effective at the same node spacing as standard isogrid, and can be even more weight effective at larger node spacing. With two secondary stiffener structures, the primary node spacing needs to increase significantly to achieve more weight savings.

By using a fractal-stiffened grid design, weight savings are achieved by separating the stiffener (web) structure into a primary grid structure and one or more secondary fractalgrid structures. The primary grid structure and its corresponding pocket size can be selected to prevent global bucking with only minimal consideration for local buckling. Secondary fractalgrid structures are selected to prevent local buckling and provide some benefit to global buckling. The result is an improved primary stiffener (web) structure with a low mass secondary stiffener (web) structure(s) and thin skin or panel thickness. This method is superior to an isogrid design with a single stiffener configuration, which has to compromise stiffener efficiency and skin thickness to prevent global buckling and local buckling. Designing an integrally grid-stiffened fractalgrid structure separates the global and local buckling phenomenon with targeted stiffening structures, which allows the fractalgrid stiffening structures to achieve more stiffener efficiency and more skin efficiency. Skin efficiency increases with smaller pockets while stiffener efficiency increases with large pockets and bigger stiffeners. The advantages include weight savings, reduced sensitivity to primary stiffener spacing, isotropic behavior and self-similar scalability. By self-similarity it is meant that the secondary pockets in the one or more secondary fractalgrid structures are smaller versions of the primary pockets in the primary grid structure, and additional secondary fractalgrid structures can be added while keeping the number of nodes and node locations in primary and secondary structures unchanged by increasing the node spacing of the primary grid structure by an integer value, for example, a value of 2 if the pocket size is doubled and 3 if the pocket size is tripled. Alternatively, secondary structures can be added to the existing primary and secondary grid structures while increasing the number of nodes in the primary and secondary grid structures, but without altering existing node locations in the primary and secondary grid structures.

Figure 3:
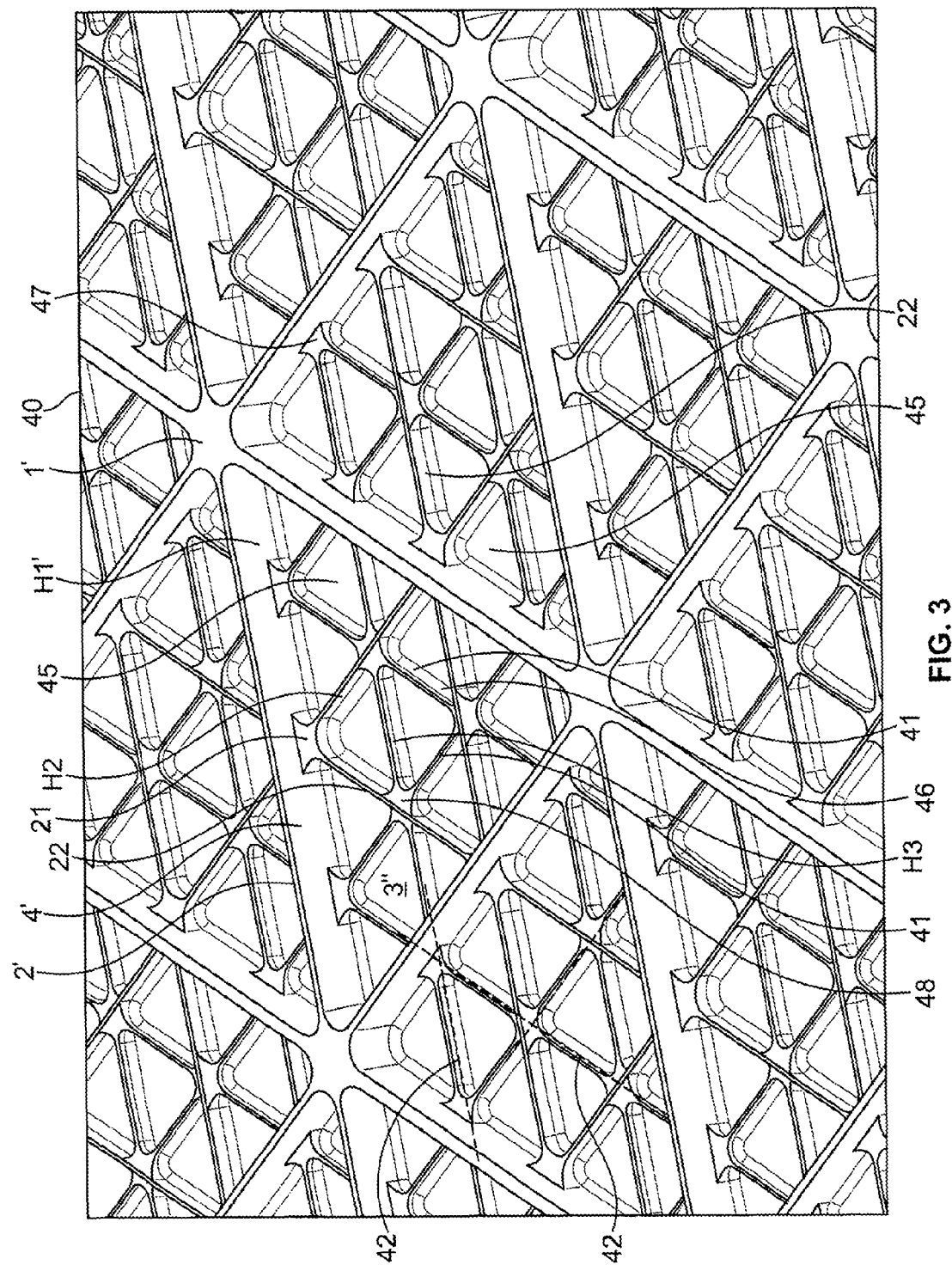
FIG. 3 is a diagrammatic representation of perspective view of a section of another possible fractalgrid support according to this disclosure having two secondary structures of fractal-stiffeners.

FIG. 3 illustrates a section of a larger panel of a fractalgrid structure of the present invention and also illustrates the concept of self-similarity and the use of a second secondary fractalgrid structure to form another possible fractalgrid structure 40 of the present disclosure. The secondary fractalgrid comprises a third set of webs (stiffeners) 41 comprising linear ribs 46 that join together at rounds 48 and 47. Round 48 joins two linear ribs 46 to one of the linear ribs 22 of the first secondary fractalgrid structure. Each linear rib 46 has a longitudinal axis 42. In one embodiment, the location of round 48 coincides with the bisection of the axes 42 with linear ribs 22. Round 47 joins linear ribs 46 with linear ribs 4' of the primary web structure. The third set of webs 41 define third pocket portions 45, which in the embodiment illustrated in FIG. 3 is shaped as an equilateral triangle. In general, the length of the sides defined by the pocket regions in each subsequent secondary fractalgrid structure is decreased, for example by half as much, although the decrease can be any integer value. The linear ribs 46 of the second set of webs 41 extend orthogonally (out of the paper) a distance H3 from one side of panel 3' of the structure. H3 is less than both H1' and H2, and H3 can be 25-50% of H2. H2 or H3 can be between 10 and 50% of H1'. H1', H2 and H3 are influenced by material properties, manufacturing constraints, skin thickness, and node spacing, whether driven by weight considerations alone, or other factors. The height of liner ribs 46 is about between 2 to 4 times the thickness of the skin sheet.

Figure 8:
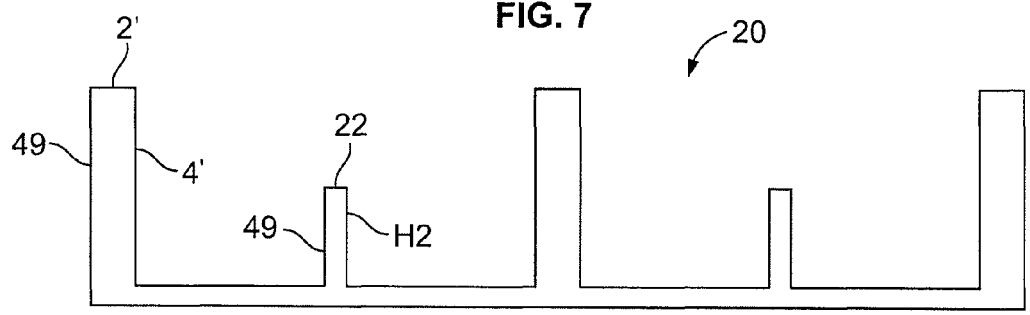
FIGS. 8 & 9 are graphical representations of two possible cross-sectional shapes for the primary and secondary rib structures.
Figure 9:
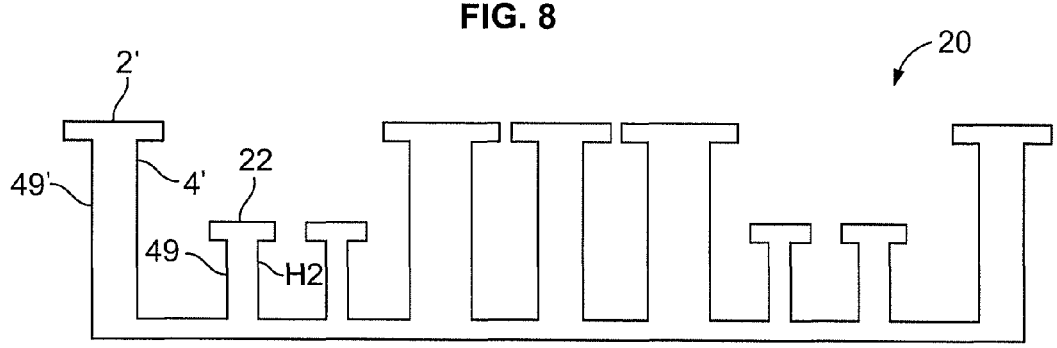

The stiffener cross sections 49 are graphically represented in an exaggerated manner in FIGS. 8 & 9. FIG. 8 illustrates the cross sectional shape 49 of the primary rib 2' and the secondary rib 22 as presented in FIG. 2, namely a rectangular shaped cross section. FIG. 9 presents one of a number of possibly shapes of a rib cross section, namely a T-shaped cross section 49'. Of course, it is possible that the primary rib 2' may be of a different cross sectional shape as the secondary ribs 22. The cross sectional shapes chosen for both the primary and secondary structures can be based not only on design strength criteria, but also on ease of manufacturing.

Stiffeners with rectangular cross sections 49 are defined by their height and their aspect ratio, i.e., the height to thickness ratio. Typically, acceptable weight efficient primary stiffeners have the high aspect ratios that avoid local failure phenomenon, such as crippling, and within manufacturing constraints, such as bending or forming of the panel after machining. Secondary stiffeners typically have aspect ratios that are as high as practical for the same reasons, but may be smaller to reduce additional fillet mass, which is determined by the design process before manufacturing. It should be understood that ribs are not limited to having rectangular cross-sections. Alternative cross sections include T-sections, trapezoidal, variable thickness, etc., are also viable alternatives to rectangular cross sections that can be used in a fractalgrid configuration and still achieve weight savings over a comparable standard isogrid configuration.

Figure 4:
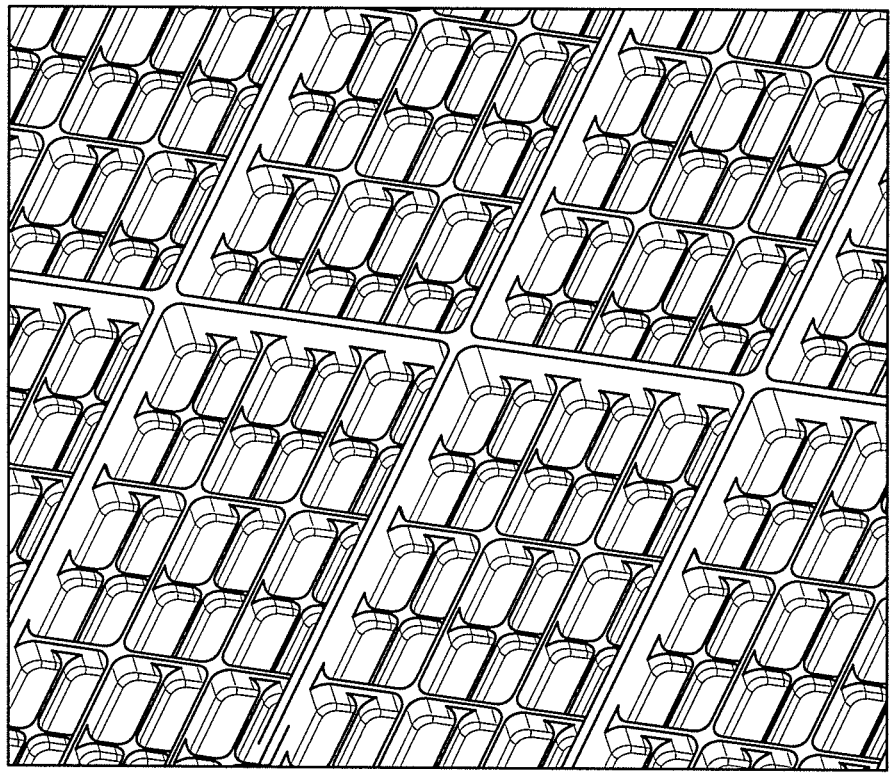
FIGS. 4 and 5 are diagrammatic representations each showing sections of additional possible fractalgrid structures based on an orthogrid platform.
Figure 5:
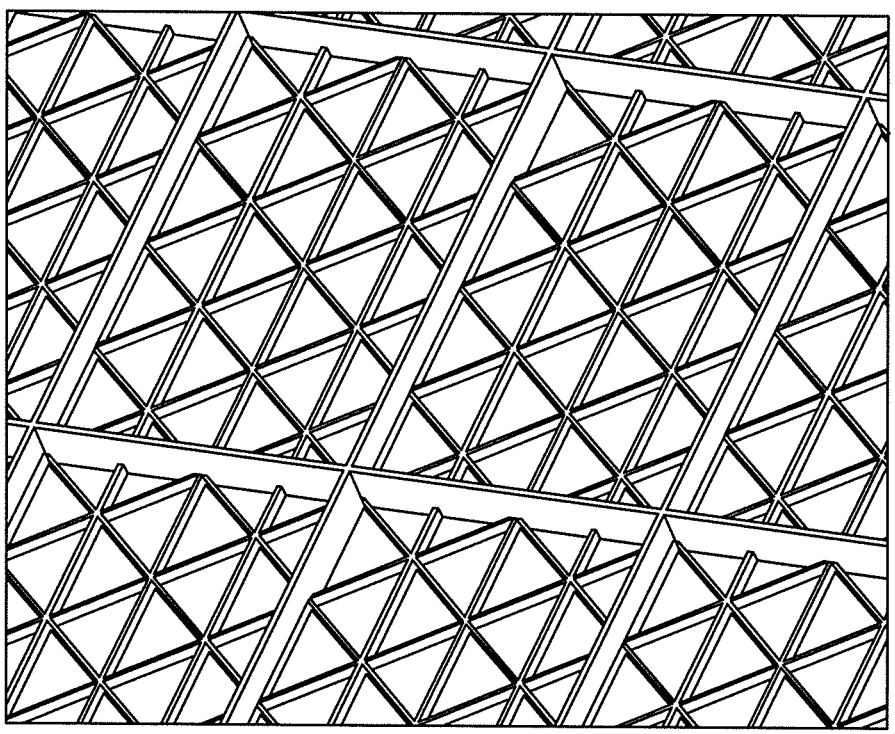

The fractalgrids of this disclosure can be prepared as "closed" structures where the grid is integral with a skin or panel sheet 3' or as "open" structures where the skin is omitted. Other types of fractalgrid designs are possible, such as those illustrated in FIGS. 4 and 5, both show only a section of a larger panel of the fractalgrid structure. FIG. 4 shows a fractal grid 50 having a primary orthogrid structure and one orthogrid secondary structure. FIG. 5 illustrates a possible fractalgrid 60 having a primary orthogrid structure and an isogrid secondary structure. In some applications, an orthogrid primary stiffening structure may offer more weight savings than an isogrid primary stiffening structure (for example, pressurized structure). Additionally, an isogrid primary stiffening structure may not be as advantageous as orthogrid where a rectilinear stiffener configuration is desirable for manufacturing considerations or secondary structure attachments. A primary orthogrid stiffening structure has the same basic function as a primary isogrid stiffening structure, and can be optimized for global buckling. The secondary stiffening structure, which could be isogrid or orthogrid, can be optimized for local buckling. FIG. 4 shows a primary orthogrid stiffening structure to prevent global buckling with a secondary and tertiary orthogrid stiffening structure to prevent local buckling. FIG. 5 shows a primary orthogrid stiffening structure to prevent global buckling with a secondary isogrid stiffening structure to prevent local buckling.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed:

1. A method of designing and manufacturing a structure comprising:
   determining positions of at least three nodes on a structure;
   forming a first set of webs onto a first side of the structure, wherein the first set of webs comprises first linear ribs that extend orthogonally from the first side to define a first height, and wherein the webs of the first set of webs connect with each other at positions that coincide with the positions of the nodes thereby defining a first pocket region;
   forming a second set of webs within the first pocket region, wherein the second set of webs comprises second linear ribs that extend orthogonally from the first side of the structure to define a second height, and wherein the second height is less than the first height and the second linear ribs connect with each other to define a second pocket region; and
   forming a third set of webs within the second pocket region, wherein the third set of webs comprises third linear ribs that extend orthogonally from the first side of the structure to define a third height that is less than the second height, and wherein a third linear rib of the third set of webs has a longitudinal axis and joins a second linear rib of the second set of webs such that the longitudinal axis bisects the second linear rib into equal parts.

2. The method of claim 1 further comprising:
   determining the positions of the nodes such that the nodes form apices of a first equilateral triangle and the first set of webs forms sides of the first equilateral triangle.

3. The method of claim 2 further comprising:
forming the second set of webs such that the second linear ribs intersect the first linear ribs and the second pocket region has the shape of a second equilateral triangle.

4. The method of claim 3 further comprising:
forming the third set of webs such that the third linear ribs intersect the second linear ribs and the third pocket region has the shape of a third equilateral triangle.

5. The method of claim 1 further characterized in that the structure is a solid sheet and that the first and second pocket regions are formed in a continuous milling operation.

6. The method of claim 1 wherein each web of the third set of webs comprises a first end unobstructedly connected to an adjacent web of the third set of webs and a second end unobstructedly connected to another adjacent web of the third set of webs.

7. The method of claim 1, wherein each web of the third set of webs is positioned inside of the second pocket region.

8. The method of claim 1, wherein the second height has a range between 10% and 50% of the first height, and wherein the third height has a range between 25% and 50% of the second height.

9. A method of designing and forming a structural panel comprising:
determining positions of at least three nodes on at least two structures each having an outside surface and an inner surface;
forming a first set of webs onto the inner surface of the structures to form an inner surface of a fuel tank, wherein the first set of webs comprises first linear ribs that extend orthogonally from the inner surface to define a first height from the inner surface, and wherein the webs of the first set of webs connect with each other at positions that coincide with the positions of the nodes thereby defining a first pocket region on the inner surface;
forming a second set of webs within the first pocket region on the inner surface of the structures, wherein the second set of webs comprises second linear ribs that extend orthogonally from the inner surface to define a second height from the inner surface where the second height is less than the first height, and wherein the second linear ribs connect with each other to define a second pocket region;
forming a third set of webs within the second pocket region on the inner surface of the structures, wherein the third set of webs comprises third linear ribs that extend orthogonally form the inner surface to define a third height from the inner surface where the third height is less than the second height, wherein the third linear ribs connect with each other to define a third pocket region, and wherein a third linear rib of the third set of webs has a longitudinal axis and joins a second linear rib of the second set of webs such that the longitudinal axis bisects the second linear rib into equal parts; and
joining the structures to form a completed fuel tank.

10. A structural support panel comprising:
a skin sheet having a thickness, an inner surface and an outer surface;
a uniform repeating first triangular pattern of a first set of webs, wherein the first set of webs comprises first linear ribs that extend orthogonally from the inner surface to define a first height from the inner surface, wherein webs of the first set of webs connect with each other at positions that coincide with nodes that are predetermined to be in particular locations, and wherein the first set of webs define a first pocket region on the inner surface;
a uniform repeating second triangular pattern of a second set of webs within the first pocket region, wherein the second set of webs comprises second linear ribs that extend orthogonally from the inner surface to define a second height from the inner surface, and wherein the second height is less than the first height and the second linear ribs connect with each other to define a second pocket region; and
a uniform repeating third triangular pattern of a third set of webs within the second pocket region, wherein the third set of webs comprises third linear ribs that extend orthogonally from the inner surface to define a third height that is less than the second height, and wherein a third linear rib of the third set of webs has a longitudinal axis and joins a second linear rib of the second set of webs such that the longitudinal axis bisects the second linear rib into equal parts.

11. The structural support panel of claim 10 wherein a second linear rib of the second set of webs has a longitudinal axis and joins a first linear rib of the first set of webs such that the longitudinal axis bisects the first linear rib.

12. The structural support panel of claim 10 further characterized in that the first and second set of webs are integral with the skin sheet.

13. The structural support panel of claim 10 further characterized in that the first and second triangular patterns form an equilateral triangle.

14. The structural support panel of claim 13 where each web in the first set of webs is joined at a node at each corner of each triangle surrounded by a second rib.

15. The structural support panel of claim 10 where the first and second linear ribs are T-shaped in cross-section.

16. The structural support panel of claim 10 where the second height is about between 10 and 50% of the first height.

17. The structural support panel of claim 10 where the second height is about between 2 and 4 times the thickness of the skin sheet.

18. The method of claim 9 further comprising:
determining the positions of the nodes such that the nodes form apices of a first equilateral triangle and the first set of webs forms sides of the first equilateral triangle.

19. The method of claim 18 further comprising:
forming the second set of webs such that the second linear ribs intersect the first linear ribs and the second pocket region has the shape of a second equilateral triangle.

20. The method of claim 19 further comprising:
forming the third set of webs such that the third linear ribs intersect the second linear ribs and the third pocket region has the shape of a third equilateral triangle.

* * * * *